Oct. 10, 1967 D. L. JONES ET AL 3,346,849
RADAR-TO-MAGNETIC-TAPE BUFFERING UNIT
Filed May 6, 1964
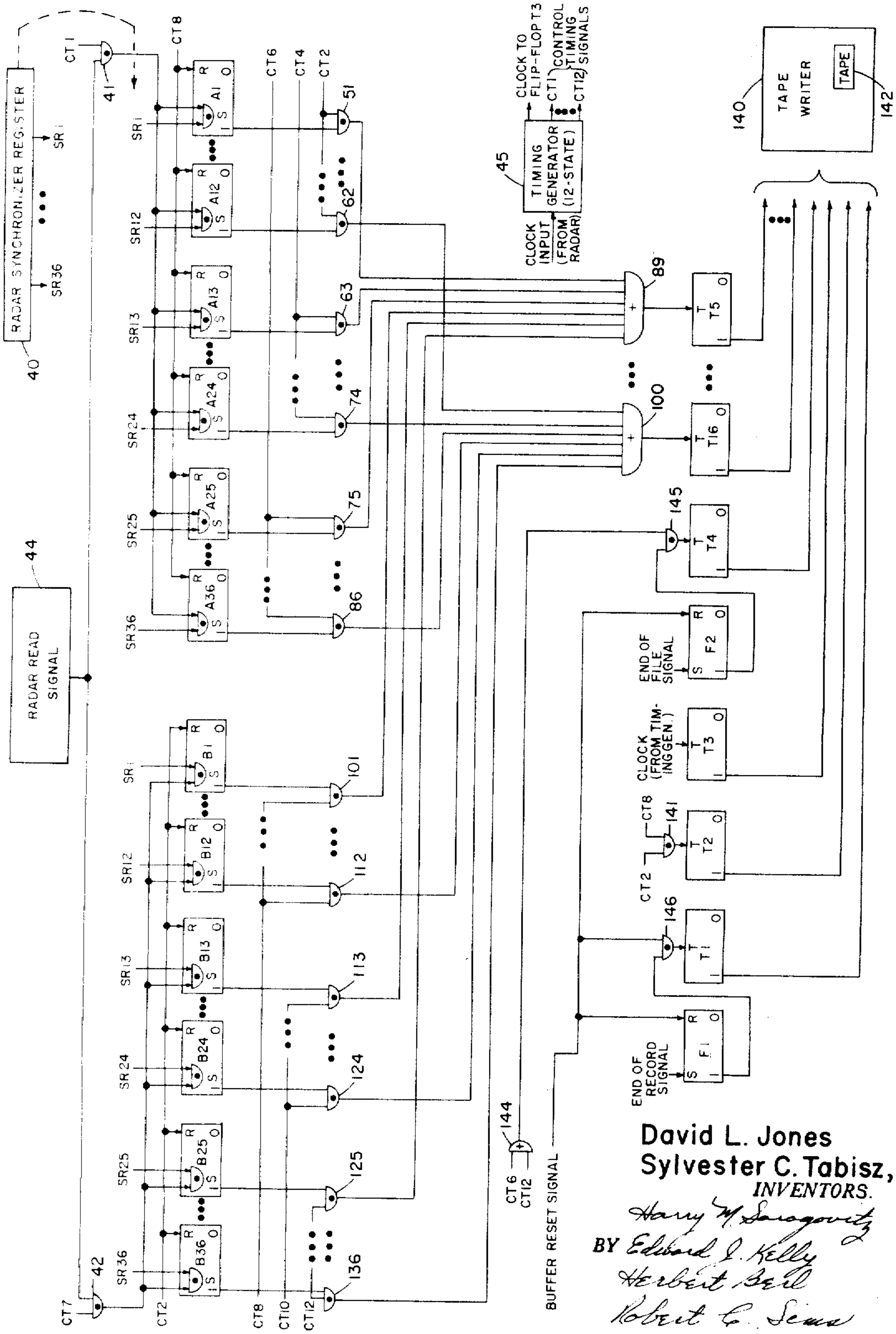
David L. Jones
Sylvester C. Tabisz,
*INVENTORS.*
BY Harry M. Saragovitz
Edward J. Kelly
Herbert Berl
Robert C. Sims

United States Patent Office 3,346,849
Patented Oct. 10, 1967

3,346,849

RADAR-TO-MAGNETIC-TAPE BUFFERING UNIT

David L. Jones, Kensington, and Sylvester C. Tabisz, Baltimore, Md., assignors, by mesne assignments, to the United States of America as represented by the Secretary of the Army Filed May 6, 1964, Ser. No. 365,542
18 Claims. (Cl. 340—172.5)

ABSTRACT OF THE DISCLOSURE

A synthetic spectrum radar system which will record certain items of information from a 36-bit Radar Synchronizer Register on a 16 channel magnetic tape. The tape is recorded in 16 parallel tape channels, each tape "word" containing 12 bits of data, 1 clock or sprocket bit, and up to 3 bits of control signal information. Timing is governed by the radar information rates.

In connection with a proposed synthetic spectrum radar system, it is desired to record certain items of information on magnetic tape. The principal problems are that a large number of separate data is to be recorded in a relatively short time, with requirements for format control. Recording is to be in 16 parallel tape channels, each tape "word" to contain 12 bits of data, 1 clock or sprocket bit, and up to 3 bits of control signal information. Timing, governed by radar information rates, allows only about 18 microseconds for storage, format control, and recording for each such 16-bit tape word.

The various parameters to be recorded are to be accumulated a few bits at a time in a 36-bit Radar Synchronizer Register and made available to the Buffer Unit in 36-bit parallel form each 54 microseconds. A further requirement is that the Buffer Unit must accept this information from the Synchronizer Register within 3 microseconds after the Synchronizer Register is filled and ready to transmit to the Buffer. The Synchronizer will furnish suitable timing and synchronizing signals to the Buffer from time to time. Finally, it is required that the system be so designed that Westinghouse G–40 Transistor Modules (see Westinghouse Advanced Development Report No. 108.11, July 1959, entitled "The G–40 Transistor Module System") can be used to construct the circuitry.

It is, therefore, an object of this invention to provide a digital storage and format control system to fulfill the above requirements.

A further object of the present invention is to provide a buffer unit suitable for use in a synthetic spectrum radar system.

A still further object of the invention is to provide a system whereby Westinghouse G–40 Transistor Modules can be used to construct the circuitry of the apparatus.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention, and in which:

The single figure shows a schematic diagram illustrating a preferred form of the present invention.

Originally, it was believed that radar timing would be sufficiently random that two storage registers would be needed in the Buffer Unit, one of which would remain open to receive output from the Radar Synchronizer Register while the other was dumping its contents onto a tape; therefore regardless of the time at which a "Radar Read" signal appears, one register or the other can instantly take the data. However, it was later found that the Synchronizer Register would be loaded at regular intervals and that synchronization could be quite easily provided. By this time other functions had been arranged for the two registers (in another mode of operation), so the two registers are retained and used here alternately to decrease the load on each register and increase reliability. The function of the system herein described can be performed by a single register, provided that synchronous relations with the Radar Synchronizer Register are maintained.

In order to better understand the operation of the system described in the figure, a description of its components referred to is first presented. A Radar Synchronizer Register 40 having outputs SR1–SR36 is indicated in block form. The three dots occurring throughout the figure indicate a plurality of like elements and connections. The outputs of the Radar Synchronizer Register are connected to both Register A and B in the manner indicated by input lines SR1–SR36 of these registers. Input lines SR1–SR36 are connected individually to one input of AND gate set inputs of the registers A1–A36 and B1–B36. The other inputs of AND gate set inputs of registers A1–A36 are connected to an output of AND gate 41. The other inputs of the AND gate set inputs of registers B1–B36 are connected to an output of AND gate 42.

A radar read signal 44 is connected to one input of AND gate 41. The other input of AND gate 41 is connected to output CT1 of timing generator 45. "Radar Read" signal 44 is also connected to one input of AND gate 42. The other input of AND gate 42 is connected to an output CT7 of the timing generator.

The timing signals are provided by a timing generator 45. This generator consists of four flip-flops and associated output gating, not shown. For a complete description of this generator see my copending application, Ser. No. 347,635, filed Feb. 26, 1964, entitled "A Twelve-State Timing Pulse Generator Using Trailing Edge Triggering," now Patent No. 3,274,498. Timing generator 45 has a clock input (from Radar), twelve output states CT1–CT12 and a clock output. Of the twelve output states through which the timing generator counts, only eight are actually used for control timing in this system. Gates are therefore provided only for clock times (CT) 1, 2, 4, 6, 7, 8, 10 and 12.

Clock time 2 (CT2) is connected to the reset inputs of registers B1–B36. AND gates 51–62 have one input connected to CT2. The other inputs of AND gates 51–62 are connected to the "one" output of registers A1–A12. Each output of AND gates 51–62 is connected to one input of OR gates 89–100 respectively. AND gates 63–74 each have an output which is connected to another input of OR gates 89–100 respectively. AND gates 75–86 are likewise connected to a further input of OR gates 89–100. AND gates 63–74 have one input connected to CT4, and the other input connected to the "one" output of registers A13–A24 respectively. The "one" output of registers A25–A36 is connected to one input of AND gates 75–86. The other input of AND gates 75–86 is connected to CT6 of timing generator 45.

The "one" outputs of registers B1–B36 are connected to inputs of AND gates 101–136 respectively. The other inputs of AND gates 101–112 are connected to output CT8 of the timing generator. Output CT10 of timing generator 45 is connected to the other input of AND gates 113–124, while output CT12 is connected to the other input of AND gates 125–136. Outputs of AND gates 101–136 are connected in groups of twelve to OR gates 89–100 in the same manner as the outputs of AND gates 51–86 are connected thereto.

The outputs of OR gates 89–100 are connected to flip-flops T5–T16 respectively. The "one" output side of each of flip-flops T5–T16 is connected to one of the channel inputs of tape writer 140. Tape writer 140 is set in a non-return-to-zero mode. This allows each turnover or change in polarity of the flip-flop's output to record a 1 on a tape 142.

Output CT8 of timing generator 45 is connected to all the reset inputs of Register A and is connected as one of the inputs of AND gate 141. The other input to AND gate 141 is clock time CT8. The output of AND gate 141 is connected to the input of flip-flop T2. Flip-flop T2 has its "one" output connected to one of the channel inputs of tape writer 140.

Timing generator 45 has a "clock" ouput which is connected to flip-flop T3. The "one" output of flip-flop T3 is connected to one of the channel inputs of the tape writer. Timing generator 45, further, has outputs CT6 and CT12 which provide the input for AND gate 144. The output of AND gate 144 is connected to one input of AND gate 145. The other input of AND gate 145 is connected to the "one" output of register F2 which has a set input connected to an "end of file" signal and a reset input connected to a "buffer reset" signal. The output of AND gate 145 is connected to the input of flip-flop T4. Flip-flop T4 has a "one" output connected to one of the input channels of tape writer 140.

The "buffer reset" signal is further connected to a reset input of register F1. The set input of register F1 is fed by an "end of record" signal. The "one" output of register F1 along with the output of AND gate 144 form the inputs of AND gate 146. AND gate 146 has an output which is connected to an input of flip-flop T1. The output of flip-flop T1 is connected to the last of the channel inputs of tape writer 140.

*Operation*

The operation of the invention occurs in the following manner. Registers A and B are completely interchangeable in their functions. Each of these registers can accept 36 bits of information in parallel from Radar Synchronizer Register 40 upon receipt of a ready signal ("Radar Read"). The output gating from each register is so arranged that one-third of the register's contents (12 bits) is read out at a time in parallel. One bit of each such 12-bit word appears at the input of each of the 12 large OR gates 89–100 which provide "turnover" input to flip-flops T5 through T16. Wherever 1's occur in the register (and hence at the inputs of these gates at the proper clock time), the associated flip-flops are caused to change state. The flip-flops in turn drive tape write amplifiers, not shown, in tape writer 140. Since writing is a non-return-to-zero mode, each turnover of change in polarity of the flip-flop's output records a 1 on tape 142.

Of the twelve states through which timing generator 45 counts, only eight are actually used to control timing in the system. Gates are therefore provided only for counts 1, 2, 4, 6, 7, 8, 10 and 12. Operations from counts 1 to 6 are identical to those from counts 7 to 12 except that registers A and B are interchanged in function. Register A is loaded during CT1 if there is a "radar read" signal present because the presence of both these signals will enable AND gate 41. The resulting output from AND gate 41 will open Register A to receive in parallel the outputs SR1 through SR36 of radar synchronizer register 40. Register A will begin to dump its contents, 12 bits at a time, onto the tape writer by way of AND gates 51 through 86, OR gates 89 through 100 and flip-flops T5 through T16.

At CT2 gates 51 through 62 are open and allow the outputs of registers A1 through A12 to flow to the input of flip-flops T5 through T16. Also at CT2 Register B is cleared to await the next block of data. At CT4 registers A13 through A24 are dumped into the tape writer in the same manner as registers A1 through A12. Likewise registers A25 through 36 are read into the tape writer at CT6. Conversely, at CT7, Register B is loaded from the Synchronizer Register and begins dumping onto tape writer 140 at CT8, CT10, and CT12, while Register A is cleared at CT8. The operation of Register B is identical to that of Register A except for the time.

Certain control or indication signals are also recorded on tape 142. The most important of these is the clock track, which serves to indicate timing or sync for each 12-bit word. Since a word is to be recorded on tape each second (2nd) clock time, the timing channel is provided by the "one" output of a first flip-flop, not shown, in the timing generator which changes state at each input clock pulse. The output of this flip-flop is fed to the turnover input of flip-flop T3, so that flip-flop T3 changes state (and consequently records a "1" on tape 142) each second clock pulse.

A second signal is to indicate the beginning of each 36-bit radar word, and it appears at the beginning of every third 12-bit tape word. This is provided by an OR gate 141 input to flip-flop T2 which causes the flip-flop to change state at CT2 and CT8. The two remaining signals, indicating end of record and end of file, are provided by the Radar Synchronizer 40. Each of these signals, when received from the Radar Synchronizer Register, sets an auxiliary flip-flop (F1 or F2) to hold the signal until the end of the current word, which is indicated by CT6 or CT12. As soon as either of these timing signals appears, flip-flop T1 (for end of record) or flip-flop T4 (for end of file) changes state, and the auxiliary flip-flop F1 or F2 is reset by the next "Buffer Reset" signal.

This "Buffer Reset" signal is primarily a synchronizing signal sent out by the Radar Synchronizer Unit, not shown, each 54 microseconds to define T1 time, and serve to keep a constant check on the timing generator by making sure that the first three flip-flops of the timing generator are in the zero state at the proper time. Normally, it would have no effect on the counter, but if anything should cause the counter to drop or pick up a count, it would be reset to its correct state at the next "Buffer Reset" time. Thus even should the counter in some way get out of sync, not more than one 36-bit word would be affected before the counter would be correctly re-synchronized with the Radar Synchronizer Register.

As stated earlier, it would be possible to operate the system with only a single 36-bit register as long as exact synchronization is maintained with the Radar Register. To do this, it is only necessary to have Register A reset or cleared immediately following the dumping of the last 12 bits onto the tape and before the next "Radar Read" signal occurs. In this modification Register B and its associated circuitry will be omitted. CT6 will be connected through a time delay circuit to the reset inputs of Register A. Also, one of the flip-flops in the timing generator can be omitted, and only four timing signals will be necessary.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features. Accordingly, I desire the scope of my invention to be limited only by the appended claims.

I claim:

1. In a radar system a tape writer having a plurality of inputs connected to outputs of a plurality of flip-flops; a first group of said flip-flops being disposed to receive output information from a plurality of registers each having first and second set inputs and a reset input; first connection means connecting said registers to said flip-flops; a source of signals containing said information; timing means having a plurality of clock time outputs; second means connecting a first clock time output of said timing means to said first set input of each of said registers; means connecting said second set inputs of the registers to said source of signals; and means connecting a second clock time output to the reset input of each of said registers.

2. In a radar system as set forth in claim 1, wherein said tape writer has a sixteen channel tape load and has sixteen inputs, and wherein said first group of flip-flops are twelve in number.

3. In a radar system as set forth in claim 2, wherein said information contains 36 bit words; and wherein said plurality of registers are 36 in number.

4. In a radar system as set forth forth in claim 3, wherein said first connection means consists of 36 AND gates having first and second inputs and an output, and 12 OR gates; the first input of each AND gate being connected to separate outputs of said registers; a third clock time output connected to the second input of 12 of said AND gates; a fourth clock time output connected to the second input of another 12 of said AND gates; said second clock time output being also connected to the second input of the remaining 12 AND gates; the outputs of each group of 12 AND gates are connected respectively to inputs of the OR gates; and the inputs of said first group of flip-flops being connected to outputs of said OR gates.

5. In a radar system as set forth in claim 4, wherein said plurality of flip-flops includes a $13^{th}$ flip-flop having an input in accordance with every other count of said timing means, a $14^{th}$ flip-flop which has a clock input signal; a $15^{th}$ flip-flop which has end of record signal input; and a $16^{th}$ flip-flop having an end of file input signal.

6. In a radar system as set forth in claim 5, wherein said second means is a further AND gate having two inputs and an output; one input being connected to a radar read signal and the other input being connected to said first clock time output; and wherein the output of said AND gate is connected to the first set input of each of said registers.

7. In a radar system as set forth in claim 1, wherein said second means is an AND gate having two inputs and an output; one input being connected to a radar read signal and the other input being connected to said first clock time output; the output of said AND gate being connected to the first set input of each of said registers.

8. A buffer unit comprising in combination first and second groups of registers each having two set inputs, a reset input and an output; a source of signals containing information; first means connecting said first set inputs of each group of registers to receive said information from the source of signals; second means so connected to each of said second set inputs of said first group of registers whereby upon an output of the second means said first group of registers will be open to read in parallel said information therein; third means so connected to each of the second set inputs of said second group of registers that upon an output of this third means said second group of registers will be open to receive in parallel said information therein; and fourth means connecting the outputs of both groups of said registers to a common load.

9. A buffer unit as set forth in claim 8 further including a timing generator having a plurality of clock time outputs; and a radar read signal; and wherein said radar read signal and a first clock time output are connected to the input of said second means; and said radar read signal and a second clock time output are connected to the input of said third means.

10. A buffer unit as set forth in claim 9, wherein said second means comprises a first AND gate having two inputs and an output; and wherein said third means comprises a second AND gate having two inputs and an output.

11. A buffer unit as set forth in claim 10, wherein said information comprises 36 bit words; and wherein said first and said second group of registers each contain 36 registers.

12. A buffer unit as set forth in claim 11, wherein said source of signals comes from a radar synchronizer register having 36 bit words output.

13. A buffer unit as set forth in claim 11, wherein said fourth means includes first through sixth groups of AND gates having first and second inputs and an output; and further means connecting the outputs of said first group of registers to the first input of said first, second and third groups of AND gates; means connecting the outputs of said second group of registers to the first input of said fourth, fifth and sixth groups of AND gates; means connecting the second input of said first through sixth to outputs of said timing means; and a single group of fifth means connecting each of said groups of AND gates to the load.

14. A buffer unit as set forth in claim 13, wherein said groups of AND gates each are 12 in number; and said timing means is a generator which counts through 12 states identified as outputs CT1 through CT12, has a clock input and a clock output.

15. A buffer unit as set forth in claim 14, wherein said first clock time output, connected to the input of said first AND gate, is output CT1 of the generator; wherein said second clock time output is output CT7 of the generator; wherein CT2 is connected to the reset inputs of all the registers in said second group of registers; CT2 is further connected to the second inputs of the first group of AND gates; CT4, CT6, CT8, CT10, and CT12 are connected to the second through sixth groups of AND gates respectively; and wherein CT8 is further connected to the reset inputs of the first group of registers.

16. A buffer unit as set forth in claim 15, wherein said fifth means comprises twelve OR gates each having first through sixth inputs; and an output and twelve flip-flops each having an input and having one output connected to a separate channel amplifier in said load; and wherein first through sixth inputs of each of said OR gates are connected to one output of said first through sixth groups of AND gates respectively; and wherein the outputs of said OR gates are fed into said flip-flop's inputs.

17. A buffer unit as set forth in claim 16, wherein said load is a tape writer having a 16 channel tape.

18. A buffer unit as set forth in claim 17 further comprising four additional flip-flops connected to said tape writer.

References Cited

UNITED STATES PATENTS 2,905,930 9/1959 Golden ............ 340—174

ROBERT C. BAILEY, *Primary Examiner.*

O. E. TODD, Jr., P. R. WOODS, *Assistant Examiners.*